US009503164B1

United States Patent
Zhang et al.

(10) Patent No.: US 9,503,164 B1
(45) Date of Patent: Nov. 22, 2016

(54) METHOD AND APPARATUS FOR CHANNEL ESTIMATION IN MASSIVE MIMO SYSTEMS WITH DYNAMIC TRAINING DESIGN

(71) Applicant: Hong Kong Applied Science and Technology Research Institute Company Limited, Hong Kong (HK)

(72) Inventors: Yuxian Zhang, Hong Kong (HK); Man Wai Victor Kwan, Hong Kong (HK); Eric Kong Chau Tsang, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 59 days.

(21) Appl. No.: 14/733,964

(22) Filed: Jun. 9, 2015

(51) Int. Cl.
  *H04B 7/04* (2006.01)
  *H04B 17/309* (2015.01)
  *H04B 7/06* (2006.01)

(52) U.S. Cl.
  CPC .......... *H04B 7/0417* (2013.01); *H04B 7/0634* (2013.01); *H04B 17/309* (2015.01)

(58) Field of Classification Search
  USPC ....................................... 370/334
  See application file for complete search history.

(56) References Cited

U.S. PATENT DOCUMENTS

| 8,837,621 | B2 | 9/2014 | Guey | |
| 9,209,870 | B1* | 12/2015 | Nammi | H04B 17/309 |
| 2010/0254485 | A1 | 10/2010 | Yoshii et al. | |
| 2013/0182594 | A1* | 7/2013 | Kim | H04W 72/042 370/252 |
| 2013/0272263 | A1 | 10/2013 | Pi | |
| 2014/0254702 | A1 | 9/2014 | Lee et al. | |
| 2016/0164593 | A1* | 6/2016 | Lee | G07F 9/00 370/329 |

OTHER PUBLICATIONS

L. Choi et al., "Downlink training techniques for FDD massive MIMO systems: open-loop and closed-loop training with memory," IEEE Journal of Selected Topics in Signal Processing, vol. 8, No. 5, pp. 802-814, Oct. 2014.

* cited by examiner

*Primary Examiner* — Kouroush Mohebbi
(74) *Attorney, Agent, or Firm* — Ella Cheong Hong Kong; Samt T. Yip (57) ABSTRACT

This invention is concerned with estimating a massive multi-input multi-output (MIMO) channel. In one embodiment, the transmit antennas are first partitioned into antenna groups each comprising a subset of the transmit antennas such that a pre-determined level of channel-estimation accuracy is attainable. For each antenna group, training signals for estimating a group of channels associated with the antenna group are determined. In particular, the number of the antenna groups, the subset of the transmit antennas for forming the antenna group, and the training signals for the antenna group are determined based on spatial correlations of the massive MIMO channel, a maximum allowable total number of training signals and a transmit signal-to-noise ratio such that the pre-determined level of channel-estimation accuracy is achievable. Advantageously, the number of antenna groups is determined by identifying a highest number of antenna groups under a constraint that the pre-determined level is achievable.

19 Claims, 4 Drawing Sheets

METHOD AND APPARATUS FOR CHANNEL ESTIMATION IN MASSIVE MIMO SYSTEMS WITH DYNAMIC TRAINING DESIGN

FIELD OF THE INVENTION

The present invention generally relates to channel estimation for a massive multi-input multi-output (MIMO) communication system. In particular, the present invention relates to such channel estimation with reduced computation requirements.

BACKGROUND

Due to various advantages such as a high data-transmission rate, a high beamforming gain and a high spatial resolution, massive MIMO communications have attracted considerable interest for future deployment in mobile communication systems. In a massive MIMO system, a transmitter has a very large number of transmit antennas, e.g., greater than 100. In estimating a massive MIMO channel, the large number of transmit antennas often leads to a high computation requirement and a need for a lot of training resources, e.g., orthogonal time/frequency resource, in channel estimation. It is desirable to reduce these demands in operations in mobile communication systems.

US20130182594 discloses a reduced-complexity channel-estimation technique by grouping the transmit antennas into groups for training. By reducing the number of antennas for estimation in each group, channel estimation requires less computation. However, spatial correlations are not taken into account to improve accuracy in channel estimation. Reduced-complexity techniques disclosed by US20130272263 and US20140254702 also have an estimation-accuracy issue since channel correlations are not taken into account. U.S. Pat. No. 8,837,621 teaches transmitting pilot reference signals on only a subset of antennas and using spatial interpolation to obtain channel estimates for other antennas. However, high estimation error results when spatial correlations among the antennas are not adequately high.

There is a need in the art to have a technique for estimating the massive MIMO channel with improved estimation accuracy while maintaining low requirements in computation and in training resources.

SUMMARY OF THE INVENTION

An aspect of the present invention is to provide a method for estimating a massive MIMO channel on which a first communication device having plural transmit antennas communicates with a second communication device having a single receive antenna. The massive MIMO channel has a channel covariance matrix that characterizes spatial correlations among the transmit antennas. In the method, the first communication device partitions the transmit antennas into plural antenna groups with each comprising a subset of the transmit antennas such that a pre-determined level of channel-estimation accuracy is attainable. For an individual antenna group, one or more training signals for estimating a group of channels associated with the subset of the transmit antennas belonging to the individual antenna group are determined. In particular, the number of the antenna groups, the subset of the transmit antennas for forming the individual antenna group, and the one or more training signals for the individual antenna group are determined based on the spatial correlations, a maximum allowable total number of training signals and a transmit signal-to-noise ratio (SNR) such that the pre-determined level of channel-estimation accuracy is achievable.

Preferably, the number of antenna groups is determined by identifying a highest number of antenna groups under a constraint that the pre-determined level of channel-estimation accuracy is achievable. The identified highest number is less than or equal to the maximum allowable total number of training signals.

In one embodiment, the partitioning of the transmit antennas comprises the following steps. A first step is to computing a first channel-estimation accuracy level achieved in an absence of partitioning the transmit antennas, whereby the pre-determined level of channel-estimation accuracy may be related to the first channel-estimation accuracy level. A second step is as follows. Given a trial number of antenna groups, determine, for each antenna group, a candidate subset of the transmit antennas and a candidate number of the one or more training signals so as to compute a second channel-estimation accuracy level attained by partitioning the transmit antennas into the trial number of antenna groups. In particular, the second channel-estimation accuracy is computed based on the spatial correlations, the transmit SNR, the trial number of antenna groups, and the candidate number of the one or more training signals for each antenna group. In a third step, the second step is repeated for different trial numbers until the second channel-estimation accuracy level achieved for one trial number is better than the pre-determined performance level. The number of antenna groups is determined to be the aforesaid one trial number. The fourth step is to determine, for each antenna group, the subset of the transmit antennas for forming this antenna group to be the candidate subset therefor associated with the aforesaid one trial number.

The disclosed method is implementable in a base station comprising plural radio antennas, a radio transceiving unit and one or more processors.

Other aspects of the present invention are disclosed as illustrated by the embodiments hereinafter.

DETAILED DESCRIPTION

An aspect of the present invention is to provide a method for estimating a massive MIMO channel. The method is developed based on the following observations.

Consider a massive MIMO channel on which a first communication device having N transmit antennas communicates with a second communication device having a single receive antenna. Let h be an N×1 complex channel-gain vector of the massive MIMO channel, and R be a channel covariance matrix given by $R=E\{hh^H\}$ where $(\cdot)^H$ denotes complex conjugate transpose. It is assumed that R is known to both the first and the second communication devices, and that it remains approximately invariant during a long period. Moreover, h remains invariant during a shorter period within which estimation of h is performed. This period is commonly known as the channel coherence time. It is desired to estimate h by sending one or more training symbols from the N transmit antennas to the second communication device.

A known technique for estimating h is given by L. Choi et al., "Downlink training techniques for FDD massive MIMO systems: open-loop and closed-loop training with memory," *IEEE Journal of Selected Topics in Signal Processing*, vol. 8, no. 5, pp. 802-814, October 2014, the disclosure of which is incorporated by reference herein. First, perform an eigen-decomposition on R to give $$R = Q \Lambda Q^H \quad (1)$$

where $\Lambda$ is a diagonal matrix having eigenvalues of R as diagonal elements, and Q is a matrix containing eigenvectors of R. Consider that m training signals are used to estimate h where m<N. The optimal training signals, represented as an N×m matrix S, are given by $$S = \sqrt{\gamma} Q(1:m) \quad (2)$$

where $\gamma$ is a transmit signal-to-noise ratio (SNR) and Q(1:m) is an N×m matrix composed of m eigen-vectors corresponding to the m largest eigenvalues of R. The signal received at the second communication device, denoted as an m×1 matrix y, is given by $$y = S^H h + n \quad (3)$$

where n is an m×1 noise vector. Estimation based on the minimum mean-square error (MMSE) approach yields an estimate of h, denoted as $\hat{h}$, given by $$\hat{h} = RS(I_m + S^H RS)^{-1} y, \quad (4)$$

in which $I_m$ is an m×m identity matrix. The estimated channel covariance matrix, $\hat{R} = E(\hat{h}\hat{h}^H)$, is $$\hat{R} = RS(I_m + S^H RS)^{-1} S^H R. \quad (5)$$

The mean-square error (MSE) of estimation, $\eta$, is given by $$\eta = N^{-1} E(\|h - \hat{h}\|^2) = 1 - \mu/N \quad (6)$$

where $$\mu = tr(\hat{R}) = \sum_{i=1}^{m} \frac{\gamma \lambda_i^2}{\gamma \lambda_i + 1} \quad (7)$$

in which $\lambda_i$ is the i th largest eigenvalue of R. It is apparent that $\hat{h}$ obtained by (4) requires an eigen-decomposition operation of (1) and then a computation operation of a matrix inverse in (4). The complexity of each of these two operations is of the order $N^3$. It follows that the overall complexity of performing channel estimation is $O(N^3)$, thereby leading to huge computation requirements for a massive MIMO system in which N can be as high as or even greater than 100.

The inventors have made the following observations that form the basis in developing the present invention. If the N transmit antennas are partitioned into G groups of adjacent antennas, and if the correlation between any two antenna groups is neglected, the estimation of the massive MIMO channel can be done by independently carrying out channel estimation for each antenna group. The overall complexity in performing estimation of the massive MIMO channel is only $O(N^3/G^3)$ roughly. If the number of antenna groups for dividing the N transmit antennas is large, a significant reduction in computation requirement results. It is therefore desirable to have G as large as possible. However, a higher value of G leads to an increased estimation error due to neglecting the mutual correlation among the G antenna groups. The inventors have observed that due to a large number of transmit antennas, the antenna spacing among the transmit antennas of a massive MIMO system is much shorter than the antenna spacing for a mobile communication system using a low number of transmit antennas, e.g., 8 as is commonly used in a present-day Long Term Evolution (LTE) system. Insufficient antenna spacing and limited scattering during radio propagation both lead to a relatively high spatial correlation. A high spatial correlation results in the largest eigenvalue more dominant than other eigenvalues as compared to the case of low spatial correlation, leading to more accurate channel estimate under the same value of m. This observation is usable as follows in the design of antenna grouping. With a pre-determined value of tolerable loss in performance, e.g., a 5% increase in the MSE, the largest value of G is determined and selected under a given m value such that the resultant performance loss is within this tolerable loss. This approach is adopted in the present invention.

Let $N_g$ be the number of adjacent antennas in the g th antenna group, and $m_g$ be the number of training signals used in channel estimation for this antenna group, where $1 \le g \le G$ and $N_g \ge m_g$. The constraints $$N = \sum_{g=1}^{G} N_g \quad (8)$$

and $$m = \sum_{g=1}^{G} N_g \quad (9)$$

are required to be satisfied. The signal from the $N_g$ transmit antennas of the g th antenna group arrives at the second communication device. The received signal, denoted as an $m_g \times 1$ matrix $y_g$, is given by $$y_g = S_g^H h_g + n_g \quad (10)$$

where $h_g$ is the $N_g \times 1$ complex-channel gain vector of the $N_g$ transmit antennas, $n_g$ is an $m_g \times 1$ noise matrix, and $S_g$ is an $N_g \times m_g$ matrix representing the training signals for the g th antenna group, given as follows. Obtain a channel covariance submatrix $R_g = E\{h_g h_g^H\}$ extracted from R and then get $$R_g = Q_g \Lambda_g Q_g^H \quad (11)$$

where $\Lambda_g$ is a diagonal matrix having eigenvalues of $R_g$ as diagonal elements, and $Q_g$ is a matrix containing eigenvectors of $R_g$. Then $S_g$ is given by $$S_g = \sqrt{\gamma} Q_g(1:m_g) \quad (12)$$

where $Q_g(1:m_g)$ is formed by $m_g$ eigen-vectors corresponding to the $m_g$ largest eigenvalues of $R_g$. An estimate of $h_g$ from $y_g$ is computed by $$\hat{h}_g = R_g S_g (I_{m_g} + S_g^H R_g S_g)^{-1} y_g \quad (13)$$

where $\hat{h}_g$ is the estimate of $h_g$. An estimate of h obtained from $\hat{h}_g$, $1 \le g \le G$, is denoted by $\hat{h}$ and is given by $$\tilde{h} = \begin{bmatrix} \hat{h}_1 \\ \hat{h}_2 \\ \vdots \\ \hat{h}_G \end{bmatrix}. \quad (14)$$

The MSE of $\tilde{h}$, denoted as $\eta_G$, is obtained as $$\eta_G = N^{-1} E(\|h - \tilde{h}\|^2) = 1 - \tilde{\mu}/N \quad (15)$$

where $\tilde{\mu} = \mathrm{tr}(\tilde{R})$ in which $\tilde{R} = E(\tilde{h}\tilde{h}^H)$. Hence, $\tilde{R} = \mathrm{diag}(\tilde{R}_1, \tilde{R}_2, \ldots, \tilde{R}_G)$ where $\tilde{R}_g = E(\hat{h}_g \hat{h}_g^H)$, and $$\tilde{\mu} = \sum_{g=1}^{G} \sum_{i=1}^{m_g} \frac{\gamma \lambda_{g,i}^2}{\gamma \lambda_{g,i} + 1} \quad (16)$$

in which $\lambda_{g,i}$ is the $i$ th largest eigenvalue of $R_g$.

Based on the foregoing observations, the present invention is elaborated as follows.

The present invention provides a method for estimating a massive MIMO channel on which a first communication device having plural transmit antennas communicates with a second communication device having a single receive antenna. In a mobile communication system, the first communication device is usually a base station (BS) while the second communication device may be a user equipment (UE) such as a mobile phone or a tablet having wireless-communication capability. However, the first or the second communication device used herein is not limited only to a BS or a UE. The massive MIMO channel has a channel covariance matrix that characterizes spatial correlations among the transmit antennas.

Figure 1:
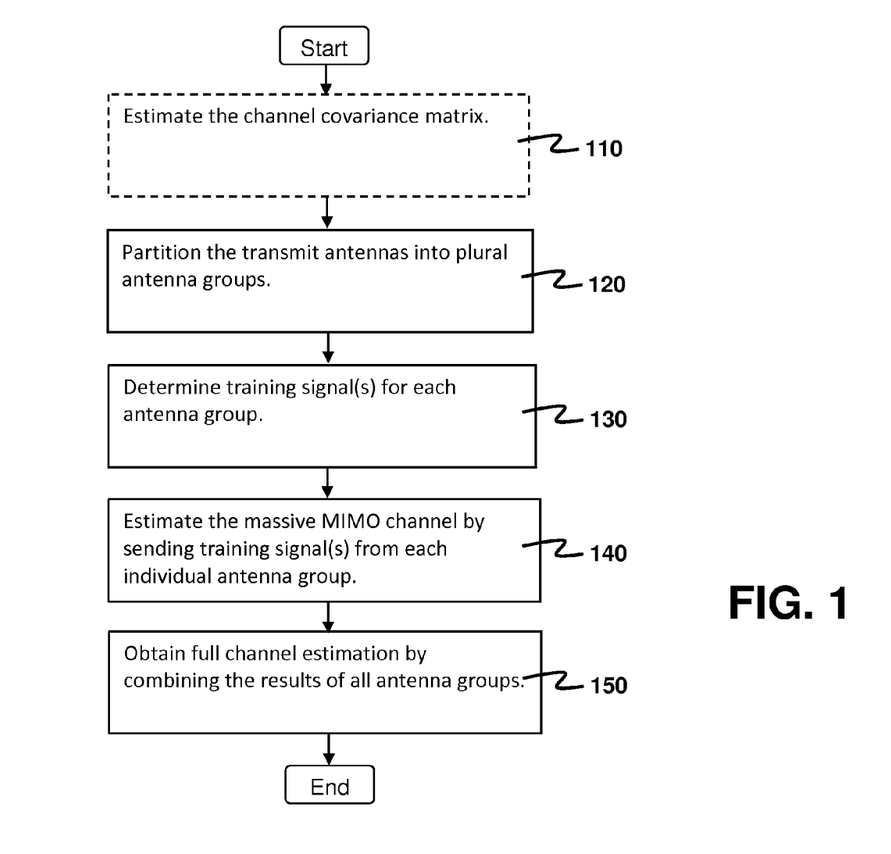
FIG. 1 is a flowchart for exemplarily illustrating the method disclosed in the present invention.

FIG. 1 is a flowchart exemplarily illustrating a flow of steps used in the method as generalized from the embodiment described above.

The method comprises a step 120 of partitioning, by the first communication device, the transmit antennas into plural antenna groups each comprising a subset of the transmit antennas such that a pre-determined level of channel-estimation accuracy is attainable. In one option used above, the pre-determined level of channel-estimation is set with a value of $\beta\mu$. Then the first communication device determines, for an individual antenna group, one or more training signals for estimating a group of channels associated with the subset of the transmit antennas belonging to the individual antenna group in a step 130. In the steps 120 and 130, the number of the antenna groups, the subset of the transmit antennas for forming the individual antenna group, and the one or more training signals for the individual antenna group are determined based on the spatial correlations, a maximum allowable total number of training signals and a transmit SNR such that the pre-determined level of channel-estimation accuracy is achievable. In one option used above, the spatial correlations are reflected in R, the maximum allowable total number of training signals is given by m, and the transmit SNR is given by $\gamma$, which is used in the computation of $\tilde{\mu}$.

Preferably, the number of antenna groups is determined by identifying a highest number of antenna groups under a constraint that the pre-determined level of channel-estimation accuracy is achievable. The identified highest number is less than or equal to the maximum allowable total number of training signals.

The method further comprises a step 140 that the first communication device transmits the one or more training signals of the individual antenna group to the second communication device, so that complex-channel gains for the subset of the transmit antennas belonging to the individual antenna group are estimable after the one or more training signals are received at the second communication device. Preferably, these complex-channel gains are estimated by a MMSE estimator. After combining estimation results for all antenna groups in a step 150, complex-channel gains for all the transmit antennas are obtained, thereby obtaining full channel estimation.

Before performing the step 120 of partitioning the transmit antenna, it is possible that the first or the second communication device estimates the channel covariance matrix in a step 110. In the art, various existing techniques are available to an ordinary skilled person for estimating the channel covariance matrix in a mobile communication system.

Figure 2:
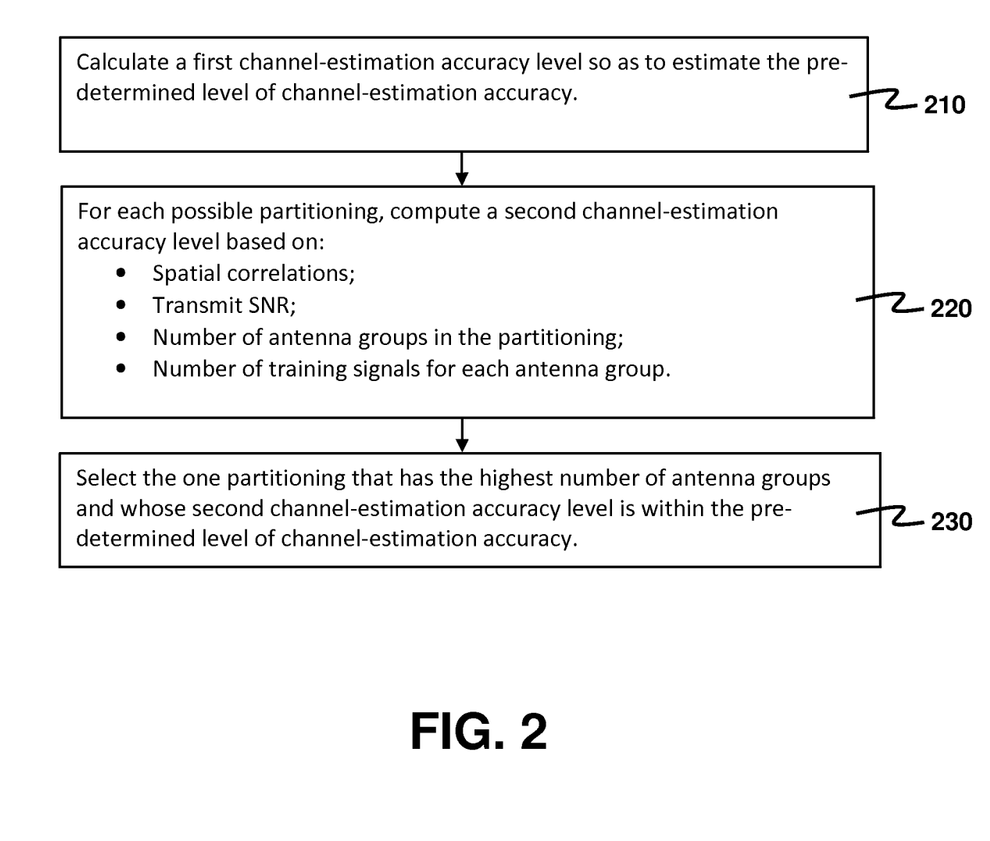
FIG. 2 depicts a flowchart illustrating one general flow of steps for performing the partitioning of the transmit antennas.

FIG. 2 depicts a flowchart illustrating a flow of steps, as follows, for performing the partitioning of the transmit antennas according to one embodiment of the present invention. Dynamic design of training signals is resulted.

Step 210. A first channel-estimation accuracy level achieved in an absence of partitioning the transmit antennas is determined. The pre-determined level of channel-estimation accuracy can be then calculated from the first channel-estimation accuracy level. As one example, the first channel-estimation accuracy level may be chosen as $\mu$, and the pre-determined level may be computed by $\beta\mu$ where $\beta$ is a number less than unity. In another example, one may use the MSE $\eta$ as the first channel-estimation accuracy level.

Step 220. Compute a second channel-estimation accuracy level for each possible partitioning. Given a trial number of antenna groups, determine, for each antenna group, a candidate subset of the transmit antennas and a candidate number of the one or more training signals, so as to compute the second channel-estimation accuracy level attained by partitioning the transmit antennas into the trial number of antenna groups. In particular, the second channel-estimation accuracy is computed based on the spatial correlations, the transmit SNR, the trial number of antenna groups, and the candidate number of the one or more training signals for each antenna group. In one example, the candidate number of the one or more training signals and the second channel-estimation accuracy level correspond to $m_g$ and $\tilde{\mu}$, respectively. In one practical implementation of the step 220, the numbers of transmit antennas among all the antenna groups are selected to be approximately the same, the candidate subset of each antenna group has the transmit antennas selected to be adjacent and physically close to each others, and the candidate number of the one or more signals of each antenna group is selected such that a ratio of the number of transmit antennas to the candidate number of the one or more signals for one antenna group is approximately the same to that of another antenna group.

Step 230. Select the one partitioning that has the highest number of antenna groups and whose second channel-estimation accuracy level is within the pre-determined level of channel-estimation accuracy.

Furthermore, in one embodiment, the partitioning of the transmit antennas is realizable as follows.

Figure 3:
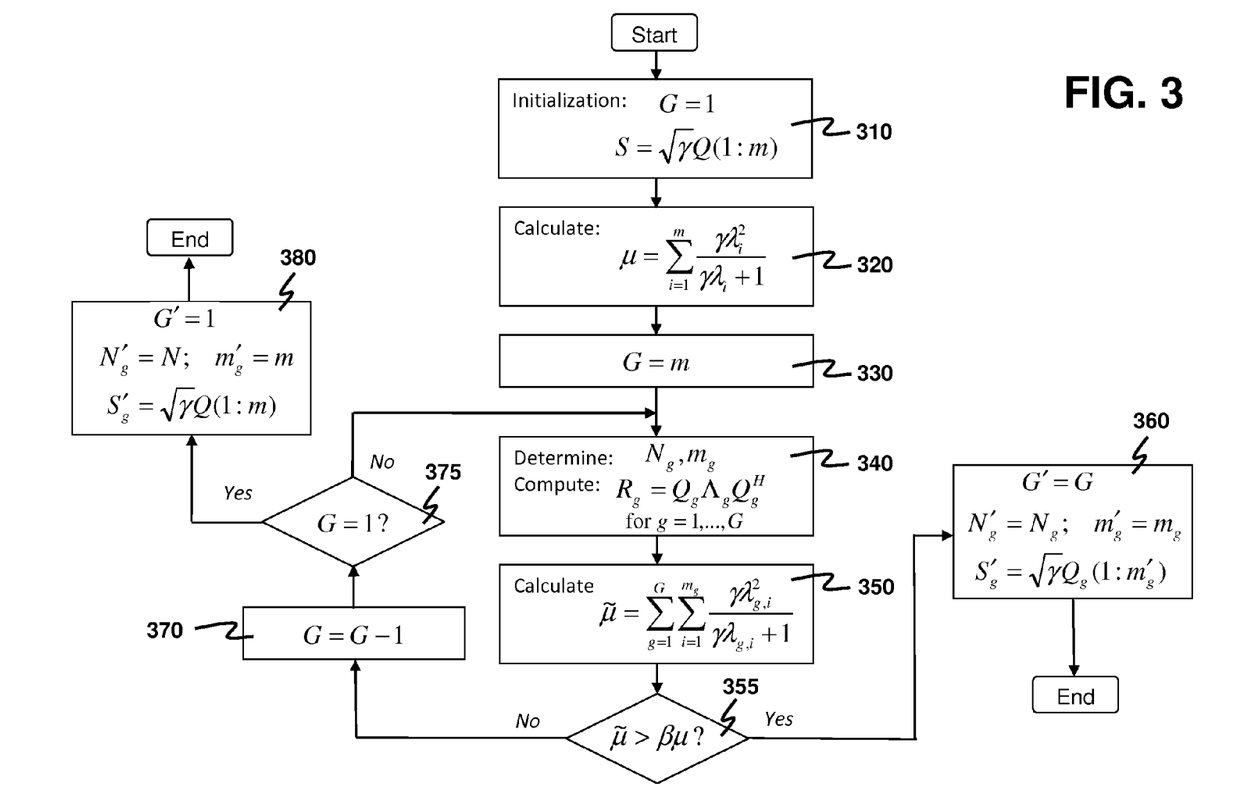
FIG. 3 depicts a flowchart illustrating the steps of partitioning of the transmit antennas according to one embodiment of the present invention.

The values of G, $N_g$ and $m_g$ are advantageously determined by a search process as illustrated by a flowchart depicted in FIG. 3. For the sake of convenience in illustrating the process, the variables G, $N_g$ and $m_g$ denote working variables during computation.

In a first initialization step 310, G is set to G=1 and S is computed by (2). Then μ is computed by (7) in a second initialization step 320. The computed value of μ corresponds to the MSE η under the condition that no antenna grouping is used, and serves as a reference performance indicator for comparison with $\tilde{\mu}$, a performance indicator when antenna grouping is present. Alternatively, one may use η as the reference performance indicator for comparison with $\eta_G$ instead. Since a higher value of $\tilde{\mu}$ corresponds to a lower MSE of $\eta_G$ as evidenced in (15), it is desired to find a maximum value of G such that the performance loss is within a tolerable limit. Exemplarily, the maximum value of G is determined under the condition that $\tilde{\mu}$ is greater than a certain proportion, β, of μ. A pre-determined value of β, which is less than unity, may be selected according to the channel-estimation accuracy that is required. For example, β may be selected to be 0.95 or 0.98.

It is desirable to find a value of G that is as high as possible in order to reduce the resultant computation requirement in channel estimation as much as possible. The search for this highest value of G is performed by a loop comprising steps 340, 350, 355, 370 and 375 for testing different trial values of G. Each execution of the loop includes evaluating a performance measure $\tilde{\mu}$ for one trial value of G. The loop uses an initial trial value of G=m set in a step 330. The step 340 comprises determining candidate values of $N_g$ and $m_g$ for $1 \le g \le G$ such that (8) and (9) are satisfied. As mentioned above, a more accurate channel estimate is obtained in the presence of higher spatial correlation under a given value of $m_g$. It follows that under the same $m_g$ value, preferably a higher value of $N_g$ is selected in case the corresponding $R_g$, which is known from R, indicates high spatial correlation. The performance measure $\tilde{\mu}$ given by (16) is then computed in the step 350. After $\tilde{\mu}$ is computed, a first test condition of $\tilde{\mu} > \beta \mu$ is tested in the step 355. If the first test condition is not satisfied, the current trial value of G yields a performance loss that is not deemed to be acceptable. The trial value of G is then decremented by one in the step 370, and the loop is re-executed for the updated trial value of G unless this updated value is already one.

Denote G', $N'_g$ and $m'_g$ as the final values of G, $N_g$ and $m_g$ obtained at the end of the search process, respectively. The $m'_g$ training signals identified for the g th antenna group are collectively denoted by an $N'_g \times m'_g$ matrix $S'_g$.

When the first test condition ($\tilde{\mu} > \beta \mu$) tested in the step 355 yields an answer of yes, the current trial value of G satisfies the channel-estimation accuracy requirement whereas the previous one with a G value greater than the current trial value by one does not. It follows that the current trial value of G is the highest possible value that satisfies the channel-estimation accuracy requirement. This current value of G is assigned to G' in a step 360, together with assigning the trial value of $N_g$ determined in the step 340 as $N'_g$, and the determined trial value of $m_g$ as $m'_g$. In the step 360, $S'_g$ is determined to be $S_g$ computed by (12) under the determined trial value of $m_g$.

In a step 375, the next trial value of G is tested with a second test condition of G=1. As is mentioned above, the loop is re-executed for this next trial value if the second test condition has an answer of no. If the answer is yes, there is not a possible antenna-grouping arrangement to satisfy the channel-estimation accuracy requirement. In this regard, the values G', $N'_g$ and $m'_g$ are identified as those for the no-grouping situation, and a step 380 is executed. In the step 380, G', $N'_g$ and $m'_g$ are assigned with a value of 1, the value of N and the value of m, respectively.

According to the foregoing determination of G', $N'_g$ and $m'_g$, the step 230 shown in FIG. 2 can be further elaborated as follows.

The step 220 is repeated for different trial numbers arranged in descending order and starting from the maximum allowable total number of training signals, until the second channel-estimation accuracy level achieved for a certain trial number is better than the pre-determined performance level. Then the determined number of antenna groups is the aforesaid certain trial number.

For each antenna group, the subset of the transmit antennas for forming this antenna group is determined to be the candidate subset of the transmit antennas associated with the aforesaid one trial number.

Note that the partitioning of the transmit antennas by the approach depicted in FIG. 3 is based on a sequential search approach. Alternatively, the partitioning of the transmit antennas may be accomplished by a general approach. It is accomplished by breaking down the step 230 into the following sub-steps.

Repeat the step 220 for different trial numbers.

A subset of all the trial numbers used in the step 220 is identified such that each trial number in this subset has the second channel-estimation accuracy level better than the pre-determined performance level.

The number of antenna groups is determined to be the highest trial number in the subset of the trial numbers.

For each antenna group, the subset of the transmit antennas for forming this antenna group is determined to be the candidate subset the transmit antennas associated with the highest trial number.

Figure 4:
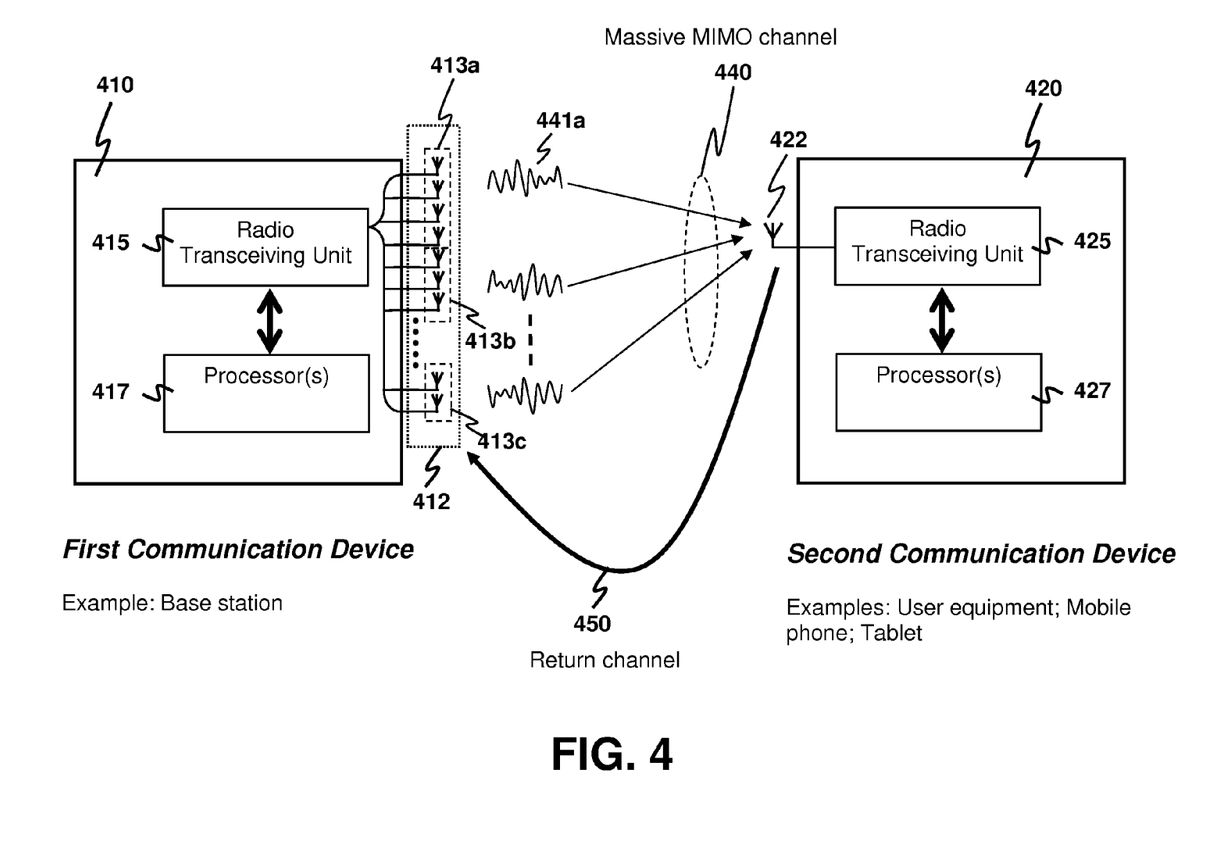
FIG. 4 depicts a first communication device sending individual sets of training signals one-by-one to the second communication device according to a partitioning of transmit antennas into plural antenna groups, whereby a massive MIMO channel is estimated.

FIG. 4 depicts a hardware setting on which the disclosed method can be implemented. A first communication device 410 such as a BS is desired to estimate a massive MIMO channel 440 for communicating with a second communication device 420 such as a UE. The first communication device 410 comprises plural radio antennas 412, a first radio transceiving unit 415 coupled to the radio antennas 412, and one or more first processors 417 configured to execute a process for estimating the massive MIMO channel when the radio antennas 412 are configured to be transmit antennas and when the second communication device 420 has one antenna 422 configured to be a receive antenna. Preferably but not strictly required, the partitioning of the transmit antennas 412 and the determining of training signals for each antenna group are performed at the one or more first processors 417 of the first communication device 410 because the first communication device 410 usually has more computation resources than the second communication device 420. The transmit antennas are divided into a plurality of antenna groups (e.g. 413*a-c*). For the first antenna group 413*a*, the one or more first processors 417 instruct the first radio transceiving unit 415 to generate a first set of training signals 441*a* for transmitting over the massive MIMO channel 440 via transmit antennas of the first antenna group 413*a*. The receive antenna 422 captures a combination of such training signals 441*a*. The combined received signal is then received by a second radio transceiving unit 425 of the second communication device 420. An estimate of the massive MIMO channel 440 associated with the transmit antennas of the first antenna group 413*a* may be computed at one or more second processors 427 of the second communication device 420. Alternatively, a digital version of the combined received signal may be sent back to the first communication device 410 via a return channel 450 so that the one or more first processors 417 of the first communication device 410 perform the estimation. The transmission of training signals from the first communication device 410 to the second communication device 420 is proceeded for all other antenna groups (such as 413b and 413c) to thereby fully estimate the massive MIMO channel 440.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for estimating a massive multi-input multi-output (MIMO) channel on which a first communication device having plural transmit antennas communicates with a second communication device having a single receive antenna, the massive MIMO channel having a channel covariance matrix that characterizes spatial correlations among the transmit antennas, the method comprising:
   partitioning, by the first communication device, the transmit antennas into plural antenna groups each comprising a subset of the transmit antennas such that a pre-determined level of channel-estimation accuracy is attained; and
   for an individual antenna group, determining, by the first communication device, one or more training signals for estimating a group of channels associated with the subset of the transmit antennas belonging to the individual antenna group;
   wherein the number of the antenna groups, the subset of the transmit antennas for forming the individual antenna group, and the one or more training signals for the individual antenna group are determined based on the spatial correlations, a maximum allowable total number of training signals and a transmit signal-to-noise ratio (SNR) such that the pre-determined level of channel-estimation accuracy is achieved.

2. The method of claim 1, wherein the number of antenna groups is determined by identifying a highest number of antenna groups under a constraint that the pre-determined level of channel-estimation accuracy is achievable, with the identified highest number being less than or equal to the maximum allowable total number of training signals.

3. The method of claim 1, further comprising:
   transmitting, by the first communication device, the one or more training signals of the individual antenna group to the second communication device, whereby complex-channel gains for the subset of the transmit antennas belonging to the individual antenna group are estimable after the one or more training signals are received at the second communication device;
   proceeding the transmitting of the one or more training signals of the individual antenna groups for all the antenna groups one-by-one, so that complex-channel gains for all the transmit antennas are obtainable; and
   obtaining full channel estimation by combining estimation results of all the antenna groups.

4. The method of claim 3, wherein the complex-channel gains for the subset of the transmit antennas belonging to the individual antenna group are estimated by a minimum mean-square error (MMSE) estimator.

5. The method of claim 1, further comprising:
   estimating, by either the first or the second communication device, the channel covariance matrix before performing the partitioning of the transmit antennas.

6. The method of claim 1, wherein the partitioning of the transmit antennas comprises the steps of:
   (a) computing a first channel-estimation accuracy level achieved in an absence of partitioning the transmit antennas, whereby the pre-determined level of channel-estimation accuracy is calculated from the first channel-estimation accuracy level;
   (b) given a trial number of antenna groups, determining, for each antenna group, a candidate subset of the transmit antennas and a candidate number of the one or more training signals, so as to compute a second channel-estimation accuracy level attained by partitioning the transmit antennas into the trial number of antenna groups, wherein the second channel-estimation accuracy is computed based on the spatial correlations, the transmit SNR, the trial number of antenna groups, and the candidate number of the one or more training signals for each antenna group;
   (c) repeating the step (b) for different trial numbers;
   (d) identifying a subset of the trial numbers used in the step (c) such that each trial number in this subset has the second channel-estimation accuracy level better than the pre-determined performance level;
   (e) determining the number of antenna groups to be the highest trial number in the subset of the trial numbers; and
   (f) determining, for each antenna group, the subset of the transmit antennas for forming this antenna group to be the candidate subset therefor associated with the highest trial number.

7. The method of claim 1, wherein the partitioning of the transmit antennas comprises the steps of:
   (a) computing a first channel-estimation accuracy level achieved in an absence of partitioning the transmit antennas, whereby the pre-determined level of channel-estimation accuracy is calculated from the first channel-estimation accuracy level;
   (b) given a trial number of antenna groups, determining, for each antenna group, a candidate subset of the transmit antennas and a candidate number of the one or more training signals, so as to compute a second channel-estimation accuracy level attained by partitioning the transmit antennas into the trial number of antenna groups, wherein the second channel-estimation accuracy is computed based on the spatial correlations, the transmit SNR, the trial number of antenna groups, and the candidate number of the one or more training signals for each antenna group;
   (c) repeating the step (b) for different trial numbers in descending order starting from the maximum allowable total number of training signals until the second channel-estimation accuracy level achieved for one trial number is better than the pre-determined performance level, whereby the determined number of antenna groups is the aforesaid one trial number; and (d) determining, for each antenna group, the subset of the transmit antennas for forming this antenna group to be the candidate subset therefor associated with the aforesaid one trial number.

8. The method of claim 7, wherein the first channel-estimation accuracy level is computed as $\mu$ according to $$\mu = \sum_{i=1}^{m} \frac{\gamma \lambda_i^2}{\gamma \lambda_i + 1},$$

the second channel-estimation accuracy level obtained in the step (b) is computed as $\tilde{\mu}$ according to $$\tilde{\mu} = \sum_{g=1}^{G} \sum_{i=1}^{m_g} \frac{\gamma \lambda_{g,i}^2}{\gamma \lambda_{g,i} + 1},$$

and the pre-determined level of channel-estimation accuracy is given by $\beta \times \mu$, where:

$\beta$ is a pre-determined number less than unity;

m is the maximum allowable total number of training signals;

$\gamma$ is the transmit SNR;

$\lambda_i$ is the i th largest eigenvalue of R, R being the channel covariance matrix;

G is the trial number of antenna groups;

$m_g$ is the candidate number of the one or more training signals for the g th antenna group; and $\lambda_{g,i}$ is the i th largest eigenvalue of $R_g$, $R_g$ being a submatrix of R corresponding to the candidate subset of the transmit antennas for the g th antenna group.

9. The method of claim 8, wherein the determining of one or more training signals for estimating the subset of the transmit antennas belonging to the individual antenna group comprises computing, after the determined number of antenna groups is obtained, $$S'_g = \sqrt{\gamma} Q_g(1:m'_g), \ 1 \leq g \leq G',$$

where:

$S'_g$ is an $N'_g \times m'_g$ matrix representing the one or more training signals for the g th antenna group;

G' is the determined number of antenna groups;

$m'_g$ is the determined number of the one or more training signals for the g th antenna group;

$N'_g$ is the determined number of the transmit antennas belonging to the g th antenna group; and $Q_g(1:m'_g)$ is formed by $m'_g$ eigen-vectors corresponding to the $m'_g$ largest eigenvalues of $R'_g$, $R'_g$ being a submatrix of R corresponding to the determined subset of the transmit antennas for the g th antenna group.

10. The method of claim 9, further comprising:

transmitting, by the first communication device, the one or more training signals for the g th antenna group from the first communication device to the second communication device, whereby the second communication device receives a signal represented by an $m'_g \times 1$ matrix $y_g$;

estimating, by either the first or the second communication device, complex-channel gains for the subset of the transmit antennas belonging to the g th antenna group, by $$\hat{h}_g = R'_g S'_g (I_{m_g} + S'_g{}^H R'_g S'_g)^{-1} y_g,$$

where $\hat{h}_g$ is the estimated complex-channel gains; and proceeding the transmitting of the one or more training signals and the estimating of complex channel gains for $1 \leq g \leq G'$ so that complex-channel gains for all the transmit antennas are obtained.

11. A base station (BS) for communicating with a user equipment (UE), the BS comprising plural radio antennas, a radio transceiving unit coupled to the radio antennas, and one or more processors configured to execute a process for estimating a massive multi-input multi-output (MIMO) channel when the radio antennas are configured to be transmit antennas to enable the BS to communicate with the UE and when the UE is configured to have one receive antenna, the process comprising:

partitioning the transmit antennas into plural antenna groups each comprising a subset of the transmit antennas such that a pre-determined level of channel-estimation accuracy is attained; and for an individual antenna group, determining one or more training signals for estimating a group of channels associated with the subset of the transmit antennas belonging to the individual antenna group;

wherein the number of the antenna groups, the subset of the transmit antennas for forming the individual antenna group, and the one or more training signals for the individual antenna group are determined based on the spatial correlations, a maximum allowable total number of training signals and a transmit signal-to-noise ratio (SNR) such that the pre-determined level of channel-estimation accuracy is achieved.

12. The BS of claim 11, wherein the number of antenna groups is determined by identifying a highest number of antenna groups under a constraint that the pre-determined level of channel-estimation accuracy is achievable, the identified highest number being less than or equal to the maximum allowable total number of training signals.

13. The BS of claim 11, wherein the radio transceiving unit is configured to:

transmit the one or more training signals of the individual antenna group to the UE, whereby complex-channel gains for the subset of the transmit antennas belonging to the individual antenna group are estimable by BS after the one or more training signals are received at the UE; and proceed the transmitting of the one or more training signals of the individual antenna groups for all the antenna groups one-by-one, so that complex-channel gains for all the transmit antennas are obtained by the BS.

14. The BS of claim 13, wherein the process further comprises estimating the complex-channel gains for the subset of the transmit antennas belonging to the individual antenna group by a minimum mean-square error (MMSE) estimator.

15. The BS of claim 11, wherein the partitioning of the transmit antennas comprises the steps of:

(a) computing a first channel-estimation accuracy level achieved in an absence of partitioning the transmit antennas, whereby the pre-determined level of channel-estimation accuracy is calculated from the first channel-estimation accuracy level;

(b) given a trial number of antenna groups, determining, for each antenna group, a candidate subset of the transmit antennas and a candidate number of the one or more training signals, so as to compute a second channel-estimation accuracy level attained by partitioning the transmit antennas into the trial number of antenna groups, wherein the second channel-estimation accuracy is computed based on the spatial correlations, the transmit SNR, the trial number of antenna groups, and the candidate number of the one or more training signals for each antenna group;

(c) repeating the step (b) for different trial numbers;

(d) identifying a subset of the trial numbers used in the step (c) such that each trial number in this subset has the second channel-estimation accuracy level better than the pre-determined performance level;

(e) determining the number of antenna groups to be the highest trial number in the subset of the trial numbers; and (f) determining, for each antenna group, the subset of the transmit antennas for forming this antenna group to be the candidate subset therefor associated with the highest trial number.

16. The BS of claim 11, wherein the partitioning of the transmit antennas comprises the steps of:

(a) computing a first channel-estimation accuracy level achieved in an absence of partitioning the transmit antennas, whereby the pre-determined level of channel-estimation accuracy is calculated from the first channel-estimation accuracy level;

(b) given a trial number of antenna groups, determining, for each antenna group, a candidate subset of the transmit antennas and a candidate number of the one or more training signals, so as to compute a second channel-estimation accuracy level attained by partitioning the transmit antennas into the trial number of antenna groups, wherein the second channel-estimation accuracy is computed based on the spatial correlations, the transmit SNR, the trial number of antenna groups, and the candidate number of the one or more training signals for each antenna group;

(c) repeating the step (b) for different trial numbers in descending order starting from the maximum allowable total number of training signals until the second channel-estimation accuracy level achieved for one trial number is better than the pre-determined performance level, whereby the determined number of antenna groups is the aforesaid one trial number; and (d) determining, for each antenna group, the subset of the transmit antennas for forming this antenna group to be the candidate subset therefor associated with the aforesaid one trial number.

17. The BS of claim 16, wherein the first channel-estimation accuracy level is computed as $\mu$ according to $$\mu = \sum_{i=1}^{m} \frac{\gamma \lambda_i^2}{\gamma \lambda_i + 1},$$

the second channel-estimation accuracy level obtained in the step (b) is computed as $\tilde{\mu}$ according to $$\tilde{\mu} = \sum_{g=1}^{G} \sum_{i=1}^{m_g} \frac{\gamma \lambda_{g,i}^2}{\gamma \lambda_{g,i} + 1},$$

and the pre-determined level of channel-estimation accuracy is given by $\beta \times \mu$, where:

$\beta$ is a pre-determined number less than unity;

m is the maximum allowable total number of training signals;

$\gamma$ is the transmit SNR;

$\lambda_i$ is the i th largest eigenvalue of R, R being the channel covariance matrix;

G is the trial number of antenna groups;

$m_g$ is the candidate number of the one or more training signals for the g th antenna group; and $\lambda_{g,i}$ is the i th largest eigenvalue of $R_g$, $R_g$ being a submatrix of R corresponding to the candidate subset of the transmit antennas for the g th antenna group.

18. The BS of claim 17, wherein the determining of one or more training signals for estimating the subset of the transmit antennas belonging to the individual antenna group comprises computing, after the determined number of antenna groups is obtained, $$S'_g = \sqrt{\gamma} Q'_g(1:m'_g), \ 1 \leq g \leq G',$$

where:

$S'_g$ is an $N'_g \times m'_g$ matrix representing the one or more training signals for the g th antenna group;

G' is the determined number of antenna groups;

$m'_g$ is the determined number of the one or more training signals for the g th antenna group;

$N'_g$ is the determined number of the transmit antennas belonging to the g th antenna group; and $Q'_g(1:m'_g)$ is formed by $m'_g$ eigen-vectors corresponding to the $m'_g$ largest eigenvalues of $R'_g$, $R'_g$ being a submatrix of R corresponding to the determined subset of the transmit antennas for the g th antenna group.

19. The BS of claim 18, wherein the process further comprises:

configuring the radio transceiving unit to transmit to the UE the one or more training signals for the g th antenna group, whereby the UE receives a signal represented by an $m'_g \times 1$ matrix $y_g$;

estimating, after the BS receives $y_g$ from the UE, complex-channel gains for the subset of the transmit antennas belonging to the g th antenna group by $$\hat{h}_g = R'_g S'_g (I_{m_g} + S'^H_g R'_g S'_g)^{-1} y_g$$

where $\hat{h}_g$ is the estimated complex-channel gains; and repeating the configuring of the radio transceiving unit and the estimating of complex-channel gains for $1 \leq g \leq G'$ so that complex-channel gains for all the transmit antennas are obtained.

* * * * *